United States Patent [19]

Kuwana et al.

[11] Patent Number: 5,046,787

[45] Date of Patent: Sep. 10, 1991

[54] ANTI-SKID CONTROL SYSTEM

[75] Inventors: Kazutaka Kuwana; Kuniaki Okamoto; Tsuyoshi Yoshida; Hiroyuki Ichikawa; Masaru Kamikado; Nobuyasu Nakanishi, all of Aichi; Tatsuo Sugitani, Shizuoka; Kazunori Sakai, Aichi, all of Japan

[73] Assignee: Aisin Seiki K.K., Aichi, Japan

[21] Appl. No.: 563,143

[22] Filed: Aug. 6, 1990

[30] Foreign Application Priority Data

Aug. 4, 1989 [JP] Japan ................................ 1-203489

[51] Int. Cl.$^5$ ............................................. B60T 8/60
[52] U.S. Cl. ............................... 303/103; 188/181 A; 188/181 C; 303/108; 303/109; 364/426.02; 180/197
[58] Field of Search .................. 303/91, 100, 102, 103, 303/108, 109, 97, 99; 364/426.02; 188/181 A, 182 C, 181 R; 180/197

[56] References Cited

U.S. PATENT DOCUMENTS

| | | | |
|---|---|---|---|
| 4,774,668 | 9/1988 | Matsubara et al. | 303/109 X |
| 4,787,682 | 11/1988 | Muto | 303/109 |
| 4,883,325 | 11/1989 | Shimanuki et al. | 303/108 X |
| 4,902,076 | 2/1990 | Ushijima et al. | 303/103 X |
| 4,932,726 | 6/1990 | Iwata et al. | 303/102 X |

Primary Examiner—Douglas C. Butler
Attorney, Agent, or Firm—Sughrue, Mion, Zinn, Macpeak & Seas

[57] ABSTRACT

The anti-skid control system is provided with wheel velocity sensors only for the driving wheels and is capable of performing the anti-skid control through its accurate estimation of the vehicle speed and proper compensatory control even when sharp braking occurs immediately upon the release of the accelerator after the occurrence of acceleration slip. The anti-skid control system is capable of starting the anti-skid control with certainty even when the braking operation is not detected because of a failure in the operation of the brake switch. The system is provided with a fluid pressure generating device, a fluid pressure controlling device, a brake operation detecting device, an acceleration detecting device, a wheel velocity detecting device, a braking force controlling device, a first estimated vehicle speed setting device and a second estimated vehicle speed setting device.

2 Claims, 8 Drawing Sheets

ANTI-SKID CONTROL SYSTEM

FIELD OF THE INVENTION

The present invention relates to an anti-skid control system which prevents the wheels from locking through control performed over the braking force exerted on the wheels at the time when the brake is applied to the wheels of a motor vehicle.

BACKGROUND OF THE INVENTION

Prior Art

It has been widely known that the directional stability of a motor vehicle is lost in some cases, depending on the conditions of the road surface, if the wheels of the motor vehicle are locked when the brake is applied sharply. In view of this, it is in practice to control the braking force in such a manner as to eventually hold the slip factor of the wheels at approximately 20%, that is, so as to obtain the maximum coefficient of friction, by controlling the brake fluid pressure in accordance with the changes in the wheel velocity and the wheel acceleration, in consideration of the fact that the wheel velocity declines abruptly immediately before the coefficient of friction $\mu$ attains the maximum value in relation to the wheels when the pressure of the brake fluid working on the wheel cylinder is increased at the time of braking.

Specifically, motor vehicles are provided with an anti-skid control system which controls the braking force by finding the estimated vehicle speed on the basis of the rotating speed of the wheels, namely, the wheel velocity, at the time of a braking operation and the acceleration of the motor vehicle and then reducing, augmenting, or maintaining the pressure of the brake fluid working on the wheel cylinder in accordance with the difference between the two factors mentioned above, which occurs along with the changes in the wheel velocity along with the passage of time, and the acceleration of the wheels, so that the wheels are not locked at the time of sharp braking.

Such an anti-skid control system is applied either to the control of the front and rear wheels, namely, all the wheels, or to the control of the rear wheels, and, in either of these applications, the system needs wheel velocity sensors which detect the rotating speed of at lease the wheels to which the driving force is transmitted, that is, the driving wheels. For the control of the front and rear wheels, such rotating speed sensors are installed for all the individual wheels including the driven wheels, and, for the control of the rear wheels, such a construction would be feasible. Yet, in consideration of various advantages, such as the simplicity of construction, wheel velocity sensors are arranged only on the side of the rear wheels, which are driving wheels.

In this regard, it is noted that a wheel spin occurs at the time of a start or an acceleration on a road surface with a low coefficient of friction, such as a snow-covered road, if excessive driving force is transmitted to the wheels. That is to say, slips will occur not only at the time of braking applied to a motor vehicle, but also at the time of its acceleration, in what is generally called "acceleration slip". In this instance, a system which is capable of detecting also the wheel velocity of the front wheels, which are the driven wheels, for example, the system embodying the technology disclosed in the Official Gazette for Patent Laid Open No. 22551-1985, can detect the acceleration slip of the driving wheels. However, in case wheel velocity sensors are installed only for the rear wheels, the detected wheel velocity will be higher than the actual vehicle speed, and it is feared that the brake fluid pressure control based on the estimated vehicle speed as mentioned above will be inadequate. In contrast with this, a method of developing a simulated vehicle speed, which makes it possible to following up on the wheel velocity up to a point immediately preceding a braking operation, is laid open, for example, in the Official Gazette for Patent Publication No. 36111-1980. Specifically, the system is designed to cause the capacitor to perform an electric discharge in accordance with the increase of the output from the acceleration sensors after the rapid discharge circuit is cut off as the brake switch is turned on.

Problems to be Overcome by the Invention

However, the techniques disclosed in the Official Gazettes mentioned above and the technique described in the Official Gazette for Patent Laid Open No. 222850-1986 which proposes a system with speed sensors provided only for the driving wheels, all make it a condition for the start of the anti-skid control that the stop switch, namely the brake switch, is turned on. Therefore, as it is pointed out as a problem also, for example, in the Official Gazette for Patent Publication No. 22551-1985 mentioned above, the anti-skid control system will fail to work in case the ON-signal is not generated because of a failure in the brake switch or a wire disconnection even if a braking operation is performed. In an effort to deal with this, the invention described in the Official Gazette for Patent Publication just mentioned makes it possible to detect the accelerator operation through detection of the changes in the slip factor in the event of such troubles as a failure affecting the brake switch. However, in case wheel velocity sensors are provided only on the side of the driving wheels, which the present invention takes as a premise, the technique mentioned above cannot be applied as it is, just because such a system will generate an inaccurate value for the estimated vehicle speed to be taken as the basis for the arithmetic operations to determine the slip factor. Moreover, also with the technique described in the Official Gazette for Patent Publication No. 36111-1980 cited above, the system does not generate any adequate estimated vehicle speed unless it receives the ON-signal from the brake switch. Consequently, in case the braking operation is performed after the above-mentioned acceleration slip has occurred, the anti-skid control can not be performed unless the ON-signal is generated from the brake switch, even if the system can set an estimated vehicle speed properly.

SUMMARY OF THE INVENTION

Objects of the Invention

Therefore, the present invention takes up as its object to offer an anti-skid control system provided with wheel velocity sensors only at the side of the driving wheels, wherein the said system is capable of always setting the estimated vehicle speed properly even in case a braking operation is performed immediately upon the release of the accelerator operation after an acceleration slip has occurred.

It is another object of the present invention to offer a system which is capable of starting the anti-skid control with certainty, setting the estimated vehicle speed properly even in case the braking operation is not detected because of a failure or the like in the operation of the brake switch.

Means of Accomplishing the Objects

Figure 1:
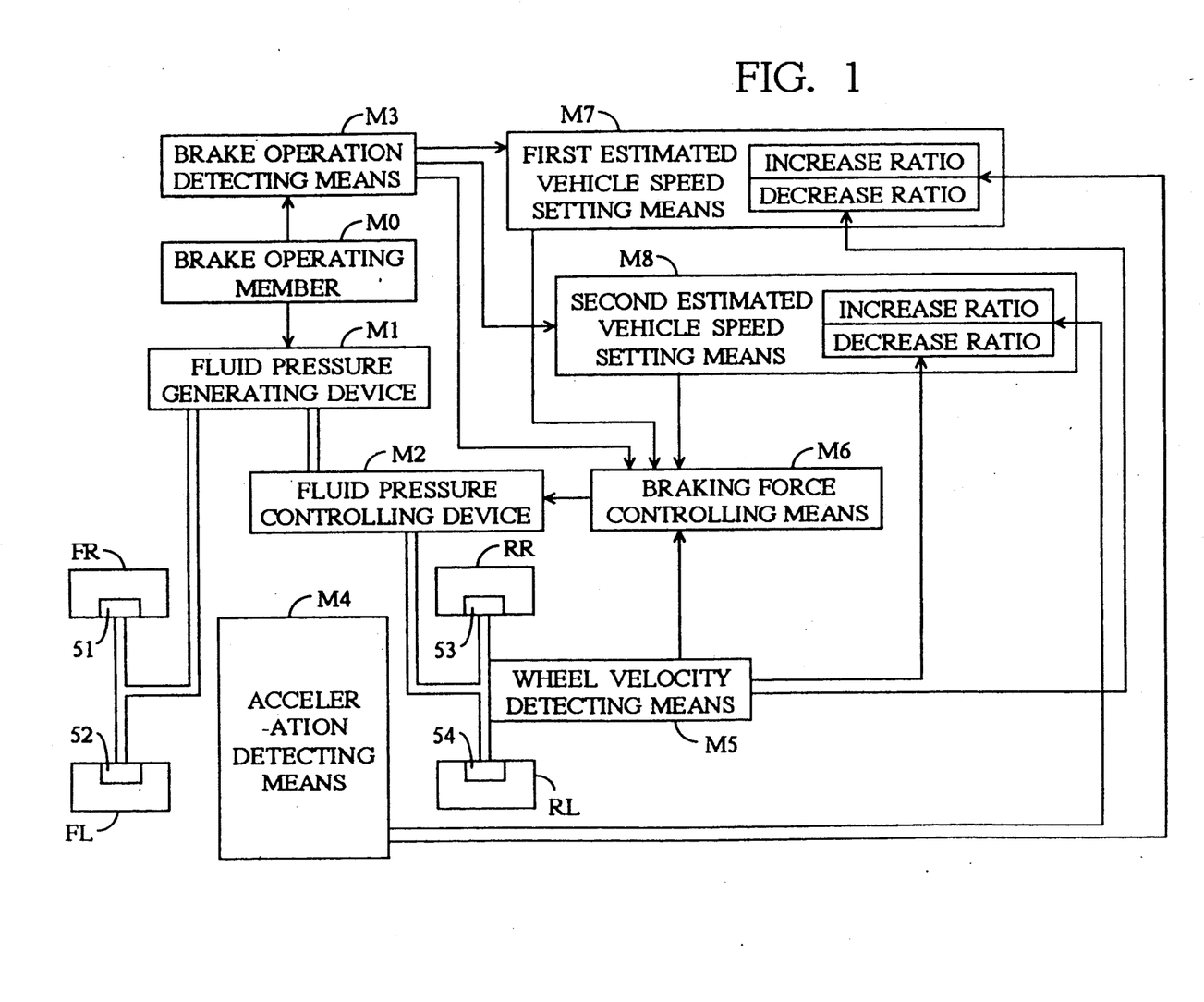
FIG. 1 is a block diagram illustrating the outline of the anti-skid control system according to the present invention.

In order to accomplish the objects described above, the anti-skid control system according to the present invention, as illustrated in the outline of its construction given in FIG. 1, is provided with wheel cylinders 51 through 54, which are installed on each and all of the individual wheels FR, FL, RR, and RL, including the wheels RR and RL, namely, the driving wheels for the motor vehicle, and furnish braking force to the said wheels, a fluid pressure generating device M1, which feeds brake fluid pressure to each of the said wheel cylinders 51 through 54 in accordance with the braking operations of the brake operating member M0, a fluid pressure controlling device M2, which is set in the fluid pressure channel connected for fluid inter-transmission with the fluid pressure generating device M1 and between the wheel cylinders 53 and 54 installed on the driving wheels RR and RL, respectively, a brake operation detecting means M3, which detects the braking operations of the brake operating member M0, an acceleration detecting means M4, which is mounted on the motor vehicle and detects the acceleration of the vehicle, a wheel velocity detecting means M5, which detects the wheel velocity of the wheels RR and RL, which are the driving wheels, and a braking force controlling means M6, which controls the brake fluid pressure to be applied to the wheel cylinders 53 and 54 installed for the wheels RR and RL by driving and controlling the fluid pressure controlling device M2 in accordance with the output signals from the wheel velocity detecting means M5 and the acceleration detecting means M4 when the brake operation detecting means M3 has detected any braking operation. Furthermore, the system is provided with a first estimated vehicle speed setting means M7 and a second estimated vehicle speed setting means M8. The first means M7 sets the prescribed increase ratio for the wheel velocity in accordance with the output signal from the acceleration detecting means M4, working out the first set speed by arithmetic operations on the basis of the said increase ratio, and also sets the prescribed decrease ratio for the wheel velocity, working out the second set speed by arithmetic operations on the basis of this decrease ratio, and then sets the first estimated vehicle speed by selecting the median value of this second set speed, the first set speed, and the wheel velocity. The second means M8 sets an increase ratio smaller than the prescribed increase ratio for the first set speed, with such a prescribed increase ratio for the wheel velocity in accordance with the output signal from the acceleration detecting means M4, works out the third set speed by arithmetic operations based on this increase ratio, thereby setting the third set speed on the basis of this increase ratio, also sets the prescribed decrease ratio for the wheel velocity, working out the fourth set speed on the basis of this decrease ratio, and sets the second estimated vehicle speed by selecting the median value of this fourth set speed, the third set speed, and the wheel velocity. Thus, when the brake operation detecting means M3 has detected any braking operation, the system calculates the first estimated vehicle speed by switching the prescribed decrease ratio for the second set speed to a decrease ratio smaller than that used prior to the detection of the braking operation and drives the fluid pressure controlling device M2 in accordance with the results obtained from the comparison of the said estimated speed with the wheel velocity, but drives the fluid pressure controlling device M2 in accordance with the result obtained from the comparison of the said estimated speed with the second estimated vehicle speed and the wheel velocity when the brake operation detecting means M3 does not detect any braking operation.

Moreover, the second estimated vehicle speed setting means M8 mentioned above should desirably be constructed in such a way that, when the wheel velocity becomes higher than the first estimated vehicle speed by a value in excess of the prescribed speed, the said means will set the prescribed increase ratio at an increase ratio smaller than the increase ratio in effect up to that time.

Effect

The anti-skid control system formed in the construction described above works in such a manner that, when the fluid pressure generating device M1 is driven in response to the braking operation of the brake operating member M0, brake fluid pressure is supplied to each of the wheel cylinders 51 through 54 by way of the fluid pressure controlling device M2, and braking force is thereby applied to the individual wheels FR, FL, RR, and RL. In the meanwhile, the brake operation detecting means M3 detects the braking operation by the brake operating member M0, and the acceleration of the vehicle is detected by the acceleration detecting means M4. Moreover, the rotating speed, namely, the wheel velocity, of the wheels RR and RL, which are the driving wheels, are detected by the wheel velocity detecting means M5.

The fluid pressure controlling device M2 mentioned above is controlled by the braking force controlling means M6 in accordance with the output signals from the acceleration detecting means M4 and the wheel velocity detecting means M5 mentioned above. In specific terms, when the brake operation detecting means M3 has detected a braking operation, the fluid pressure controlling device M2 is controlled in accordance with the result of the comparison between the first estimated vehicle speed set by the first vehicle speed setting means M7 and the wheel velocity.

The first vehicle speed setting means M7 mentioned above performs arithmetic operations to determine the first set speed and the second set speed, and the median value between these and the wheel velocity is set as the first estimated vehicle speed. Here, the prescribed increase ratio for the wheel velocity is set for the first set speed in accordance with the output signal from the acceleration detecting means M4, and, on the basis of this increase ratio, arithmetic operations are performed to work out the first set speed as the vehicle speed after acceleration for the prescribed duration of time after the detection of the wheel velocity. In the same way, the second set time is worked out by arithmetic operations, as the vehicle speed after deceleration for the prescribed duration of time, on the basis of the decrease ratio set for the wheel velocity set in accordance with the output signal from the acceleration detecting means M4.

Then, when the brake operation detecting means M3 has detected a braking operation, the decrease ratio for the second set speed is set at a value smaller than that in effect prior to the detection of the braking operation, and thereafter the first estimated vehicle speed is found by arithmetic operations. By this process, the wheel velocity at the particular moment is selected as the median value when the brake operation detecting means M3 does not detect any braking operation, and the first estimated vehicle speed is set at the same speed as the wheel velocity, until the brake operation detecting means M3 detects a braking operation, even when there has occurred a sudden decline in the wheel velocity without any braking operation (that is, a decline ins the wheel velocity subsequent to an acceleration slip). When the brake operation detecting means M3 has detected a braking operation, the second set speed at the particular moment is selected as the median value. Thus, by employing a reference speed set with the prescribed speed difference in relation to the first estimated vehicle speed, for example, the fluid pressure in the wheel cylinders 53 and 54 is increased for the prescribed duration of time and is thereafter shifts to the anti-skid control, in which a pressure reducing operation is performed.

Furthermore, the system is equipped with the second estimated vehicle speed setting means M8, which sets the second estimated vehicle speed on the basis of the third set speed and the fourth set speed and the wheel velocity in the same way as the first estimated vehicle speed setting means M7 does. When the brake operation detecting means M3 does not detect any braking operation, the fluid pressure controlling device M2 is driven in accordance with the result from the comparison of the wheel velocity and the second estimated vehicle speed. That is to say, even when the brake operation detecting means M3 has a failure, so that the result of the arithmetic operations performed by the first vehicle speed setting means M7 are not made available for the control by the braking force controlling means M6, the system can shift to the anti-skid control with the brake fluid pressure control on the basis of the result of the arithmetic operations by the second vehicle speed setting means M8.

Moreover, in case it is determined, with respect to the setting of the increase ratio for the third set speed with the second vehicle speed setting means M8, to set any increase ratio smaller than that in effect up to the particular moment, if the wheel velocity becomes higher than the first estimated vehicle speed by any excess of the prescribed speed, the increase of the second estimated vehicle speed is put under restraint at the moment when it is found that an acceleration has occurred and set at such a second estimated vehicle speed as is adequate for the control of the subsequent braking operations.

BRIEF DESCRIPTION OF THE DRAWINGS

The manner by which the above objects, features and advantages of the present invention are attained will be fully evident from the following detailed description when it is considered in light of the attached drawings, wherein.

In the Figures mentioned hereinabove, the following reference numbers represent the following items:

2 . . . Fluid pressure generating device
2a . . Master cylinder
2b . . Booster
3 . . . Brake pedal (brake operating member)
10 . . . Electronic control device
11 . . . Microprocessor
20 . . . wheel velocity sensor (wheel velocity detecting means)
21 . . . Acceleration sensor (Acceleration detecting means)
22 . . . Brake switch (brake operation detecting means)
30 . . . Actuator (Fluid pressure controlling device)
31 and 32 . . . Solenoids
40 . . . Pump
41 . . . Reserver
51 through 54 . . . Wheel cylinders
FR, FL, RR, and RL . . . Wheels

DETAILED DESCRIPTION OF THE INVENTION

Reference will now be made in detail to the construction of the anti-skid control system according to the present invention as illustrated in the accompanying drawings, in which like reference numbers designate like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 2:
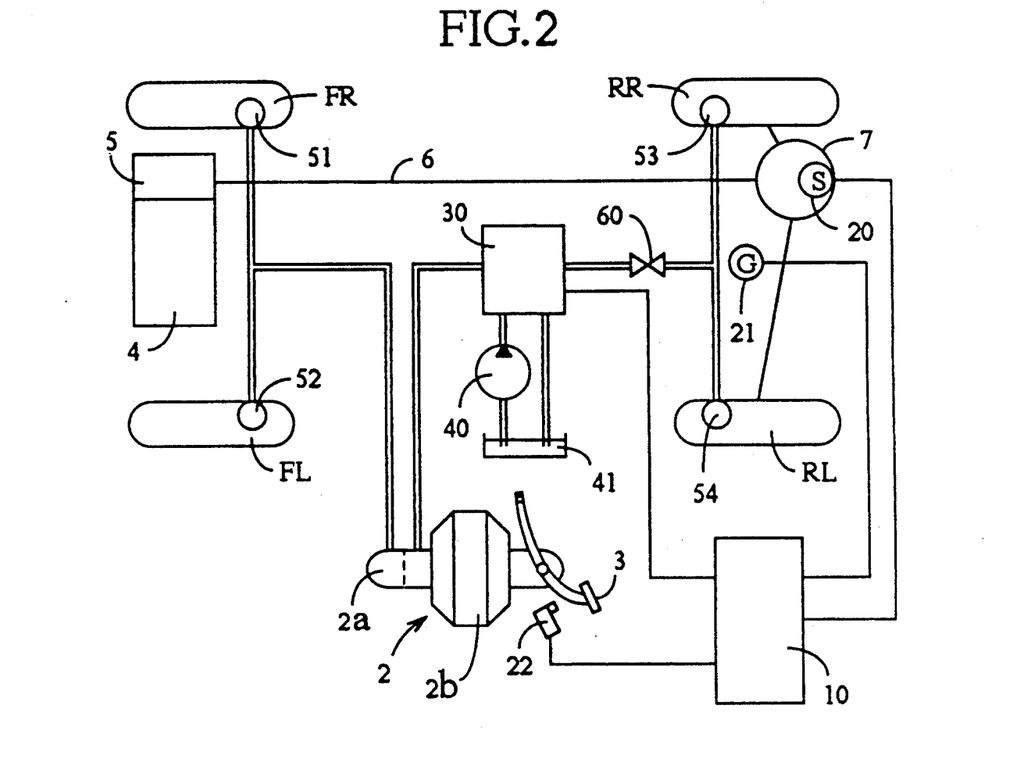
FIG. 2 is a chart illustrating the overall configuration of one preferred embodiment of the anti-skid control system according to the present invention.

Now, FIG. 2 illustrates a motor vehicle equipped with the anti-skid control system in one embodiment of the present invention, and this system has a fluid pressure generating device 2, which is comprised of a master cylinder 2a and a booster 2b and is driven with a brake pedal 3, namely, a brake operating member.

The master cylinder 2a, which is generally known as the tandem type master cylinder, is connected directly to the wheel cylinders 51 and 52 for the wheels FR and FL and connected also to the wheel cylinders 53 and 54 for the wheels RR and RL by way of the actuator (fluid pressure controlling device) 30 and the proportioning valve 60. Here, the term, "wheel FR", stands for the wheel positioned on the front right side of the vehicle as viewed from the driver's seat. Likewise, the term, "the wheel FL" represents the wheel on the front left side of the vehicle, the term, "the wheel RR", represents the wheel on the rear right side of the vehicle, and the term, "the wheel RL", represents the wheel on the rear left side of the vehicle. The piping system employed for this system is a piping system divided into two independent systems respectively serving the front wheels and the rear wheels.

The internal combustion engine 4 mounted on the vehicle used in this example of preferred embodiment has a generally known transmission 5 connected to it. The transmission 5 is connected to a differential gear 7 via a propeller shaft 6. To this differential gear 7 are connected the wheels RR and RL, to which the driving force of the internal combustion engine 4 is transmitted. Accordingly, the wheels RR and RL, namely, the rear wheels, constitute the driving wheels in this example of preferred embodiment.

Therefore, when operating force, i.e. stepping force, is applied onto the brake pedal 3, the booster 2b is driven in accordance with the stepping force, and the master cylinder 2a is driven under boosted pressure exerted by the booster 2b. By this, the brake fluid pressure in accordance with the stepping force applied onto the brake pedal 3 is output from the master cylinder 2a and supplied to the wheel cylinders 51 through 54. When the brake fluid pressure is thus applied to the wheel cylinders 51 and 52, braking force is exerted to the wheels FR and FL, i.e. the front wheels, which are the driven wheels, and, when the brake fluid pressure is applied to the wheel cylinders 53 and 54, the braking force is exerted to the wheels RR and RL, i.e. the rear wheels, which are the driving wheels.

The actuator (fluid pressure controlling device) 30, which forms the fluid pressure controlling device, is set between the master cylinder 2a and the wheels RR and RL and is connected to the pump 40 and the reserver 41. The pump 40 is driven by the internal combustion engine 4, and the brake fluid in the reserver 41 is thereby pressurized to attain an increase of its pressure, the said fluid with the increased pressure being then fed as the power pressurized fluid to the actuator 30. The actuator 30 is provided with a pair of electromagnetic switching valves not shown in the Figure, and these electromagnetic switching valves have the solenoids 31 and 32 shown in FIG. 3 and are driven with the output signals from the electronic control device 10.

Thus, the system makes an adjustment of the brake fluid pressure to such a level as will not result in any locking of the wheels RR and RL by selecting a mode as appropriate out of the available modes, which are the "pressure increase" mode, in which the fluid pressure fed out of the pump 40 is supplied to the wheel cylinders 53 and 54 and the brake fluid pressure is thereby increased, the "pressure decrease" mode, in which the brake fluid pressure is reduced by fluid inter-transfer with the reserver 41, and the "pressure hold" mode, in which the brake fluid pressure is held as it is. Furthermore, the system has still another mode, i.e. the "direct connection" mode, in which the solenoids 31 and 32 are set in their non-excited state and the master cylinder 2a thereby establishes its direct connection with the wheel cylinders 53 and 54.

The proportioning valve 60, which is set between the actuator 30 and the wheel cylinders 53 and 54 mentioned above, has the function of approximating the brake fluid pressure fed to the wheel cylinders 53 and 54 at the side of the rear wheels to the ideal distribution of the braking force by reducing the pressure in a certain ratio to the input fluid pressure. The proportioning valve 60 used in this example of preferred embodiment is one of the so-called load sensing type, which changes its characteristics in accordance with the load borne with the wheels RR and RL.

On the differential gear 7, which is connected to the wheels RR and RL, is arranged a wheel velocity sensor 20, namely, a wheel velocity detecting means. The wheel velocity sensor 20 detects the rotating speed of the propeller shaft 6, namely, the average wheel velocity $V_w$ of the rear wheels RR and RL, which are the driving wheels, and outputs electrical signals corresponding to the detected wheel velocity $V_w$ to the electronic control device 10. Also, an acceleration sensor 21, which is an acceleration detecting means, is fixed in an appropriate position to which the vibrations from the road surface and the vibrations of the internal combustion engine 4 are hardly transmitted and detects the acceleration (including deceleration unless specifically excluded) of the motor vehicle, feeding the output of electrical signals to the electronic control device 10.

Also, in order to detect the operation of the brake pedal 3, a brake switch (brake operation detecting means) 22 is provided to perform its breaking and making operations in interlocking with the brake pedal 3. This brake switch 22 is turned ON when the brake pedal 3 is operated, the stop lamp not illustrated in the Figure being thereupon turned on, and also the electrical signal indicating that the brake pedal 3 is in its operated state is output to the electronic control device 10. Thus, the output electrical signals from the wheel velocity sensor 20, the acceleration sensor 21, and the brake switch 22 mentioned above are input into the electronic control device 10.

Figure 3:
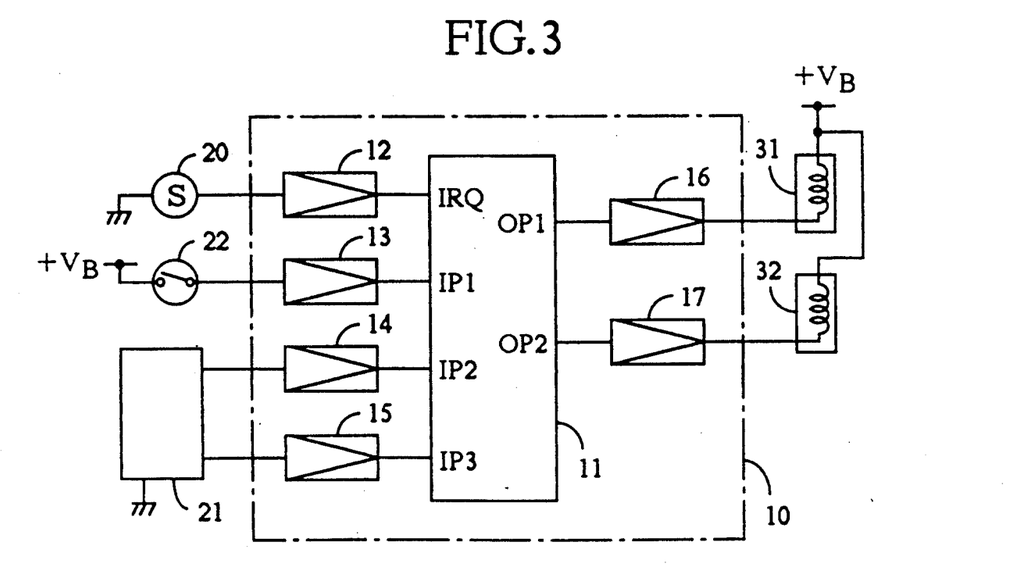
FIG. 3 is a block diagram illustrating the construction of the electronic control system shown in FIG. 2.

The electronic control device 10 is provided with a microprocessor 11, a waveform rectifying circuit 12, an input buffers 13, 14, and 15, and output buffers 16 and 17, as shown in FIG. 3. For the microprocessor 11 in this example of preferred embodiment is used a single-chip microcomputer generally offered for sale on the market, and this microcomputer has a free run timer, which outputs the current time, a ROM which stores the program, and a RAM, etc., which are necessary for the execution of the program.

To the waveform rectifying circuit 12, sine wave voltage signals are input from the wheel velocity sensor 20, and the signals are converted into square wave signals in this waveform rectifying circuit 12, the square wave signals being then fed to the interrupt requiring terminal IRQ of the microprocessor 11. Accordingly, interrupt demands are made of the microprocessor 11 at such intervals of time as are in keeping with the wheel velocity detected by the wheel velocity sensor 20.

Also, the on and off states of the brake switch 22 are input to the input port IP1 of the microprocessor 11 via the input buffer 13 in the form of a high level (H) signal for the time when the brake switch 22 is in its on-state and a low level (L) signal when the said brake switch is in its off-state. Moreover, the output from the acceleration sensor 21 is input to the input ports IP2 and IP3 of the microprocessor 11 by way of the input buffers 14 and 15. In this case, the output characteristics of the acceleration sensor 21 are set as shown in Table 1 given below, and the input signals fed to the input ports IP2 and IP3 are set at the high (H) level or the low (L) level in accordance with the acceleration of the motor vehicle. In this regard, the mark G in the table indicates the acceleration of gravity.

TABLE 1

| Acceleration Input Port | −0.4 G or less | −0.4 G to −0.2 | −0.2 G to 0.2 | 0.2 G to 0.4 G | 0.4 G or more |
|---|---|---|---|---|---|
| IP 2 | H | L | L | L | H |
| IP 3 | H | H | L | H | H |

In the meanwhile, the output port OP1 of the microprocessor is connected to the solenoid 31 on one of the electromagnetic switching valves in the actuator by way of the output buffer 16. The output port OP2 is connected to the solenoid 32 of the other electromagnetic switching valve by way of the output buffer 17. These output buffers 16 and 17 form the circuits which respectively amplify the electrical signals output from the output ports OP1 and OP2 and respectively excite the solenoids 31 and 32 of the actuator 30.

Thus, in the electronic control device 10 mentioned above, a series of processes for the anti-skid control are performed in accordance with the program executed by the microprocessor 11, and electrical signals are output from the output ports OP1 and OP2. This program has a main routine shown in the flow chart in FIG. 4 and an interrupt routine shown in the flow chart in FIG. 5 and executed when electrical signals are input to the interrupt requiring terminal IRQ.

Figure 4:
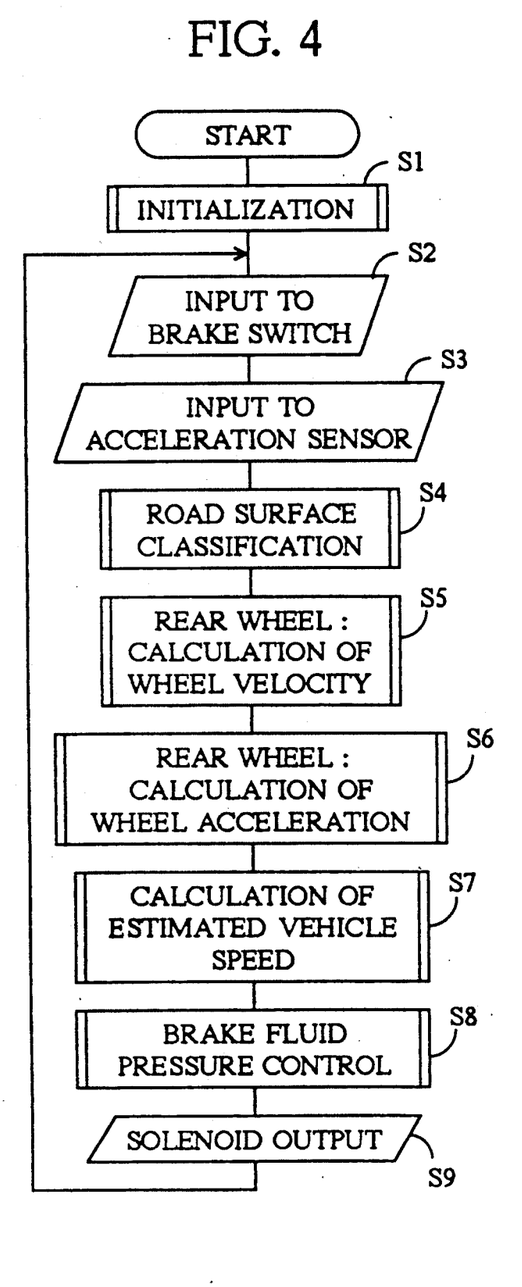
FIG. 4 is a flow chart showing the processing of the main routine for the control of braking force in one preferred embodiment of the present invention.

First, a description is made of the main routine shown in FIG. 4. When power is supplied to the electronic control device 10, the process of initialization is performed at the step S1. That is to say, the ta, tb, and "control-in-process" flag is cleared to zero. Also, the output from the output ports OP1 and OP2 are set in such a way that the solenoids 31 and 32 are put into their non-excited state.

Next, at the step S2, the signals indicating the state of the brake switch 22 are input into the microprocessor 11. Also, the operation of the system proceeding to the step S3, the signals shown in Table 1 given above are input via the input buffers 14 and 15 in accordance with the acceleration of the motor vehicle as detected by the acceleration sensor 21. Then, at the step S4, the road surface is judged on the basis of the input signals from the acceleration sensor 21. That is to say, it is judged, when the absolute value of the detected acceleration is large, that the vehicle is running on a road surface with a high coefficient of friction (the coefficient of friction is hereinafter expressed with μ), and the road surface is therefore classified as a high-μ road surface, and, in the same manner, the road surfaces with lower coefficients of friction are classified as medium-μ road surfaces and low-μ road surfaces, as shown in Table 2 given below.

TABLE 2

| IP 2 | L | L | H |
|---|---|---|---|
| IP 3 | L | H | H |
| Road Surface Classification | Low-μ | Medium-μ | High-μ |

It is to be noted in this regard that the classification given above is the one for performing the subsequent processes in accordance with the magnitude of the acceleration actually at work on the vehicle body, and it is therefore not necessarily bound by the usual meaning of the expression, "road surface classification".

Next, proceeding to the step S5, the system finds the average wheel velocity Vw by arithmetic operations with the equation (1) cited below on the basis of the period ΔTw of the output electrical signal from the wheel velocity sensor 20. In this regard, the period ΔTw is measured by the interrupt routine to be described later.

$$Vw = K/\Delta Tw \tag{1}$$

Wherein, K is a constant set on the basis of the characteristics of the wheel velocity sensor 20.

At the step S6, the wheel acceleration Gw of the rear wheels is found, by arithmetic operations with the equations (2) and (3) cited below, from the wheel velocity Vw as determined by arithmetic operations at the step S5.

$$Int = (\Delta Tw_{(n)} + \Delta Tw_{(N-1)})/2 \tag{2}$$

$$Gw_{(n)} = (Vw_{(n)} - Vw_{(n-1)})/Int \tag{3}$$

Wherein, the mark Int indicates the time for the interrupt interval, and $Vw_{(n)}$ and $\Delta Tw_{(n)}$ respectively represent the wheel velocity Vw and the period ΔTw, which have been obtained by the arithmetic operations just described, and $Vw_{(n-1)}$ and $\Delta Tw_{(n-1)}$ respectively represent the wheel velocity Vw and the period ΔTw, which were obtained earlier.

At the step S7, the first estimated vehicle speed $Vs_0$ and the second estimated vehicle speed $Vs_2$, which are described later, are determined from the state of the brake switch 22 read at the step S2, the judgment of the road surface at the step S4, and the wheel velocity Vw calculated at the step S5. In this example of preferred embodiment, the first standard speed $Vs_N$ and the second standard speed $Vs_E$ are additionally obtained from these estimated vehicle speeds wit the equations (4) and (5) given below.

$$Vs_N = A_1 \cdot Vs_0 - B_1 \tag{4}$$

$$Vs_E = A_2 \cdot Vs_2 - B_2 \tag{5}$$

Wherein, $A_1$, $A_2$, $B_1$, and $B_2$ are constants, and, for example, $A_1 = 0.97$, $B_1 = 2$ km/h are set up, and $A_2 = 0.90$, $B_2 = 5$ km/h are set up. In this regard, the details of the step S7 will be described later with reference to the subroutine with reference to FIG. 7.

Next, the operation of the system proceeds to the step S8, and the system judges how to control the brake fluid pressure in the wheel cylinders 53 and 54 on the basis of the wheel velocity Vw, the wheel acceleration Gw, the first estimated vehicle speed $Vs_0$ and the second estimated vehicle speed $Vs_2$, which are obtained at the steps, S5, S6, and S7. Moreover, the process at the step S8 will be described later. Then, the operation of the system proceeds to the step S9, at which the output signals for driving the solenoids 31 and 32 in accordance with the result of the judgment at the step S8 are output from the output ports OP1 and OP2, and the brake fluid pressure applied to the wheel cylinders 53 and 54 is thereby increased, decreased, or maintained at the same level.

The processes at the steps S1 through S9 are performed repeatedly, and, in case there occurs a considerable slip of the wheels RR and RL on the road surface by the effect of a sharp decline in the wheel velocity Vw, the brake fluid pressure is reduced to promote the rotation of the wheels RR and RL, and the slip of the wheels RR and RL on the road surface is thereby restrained.

Figure 5:
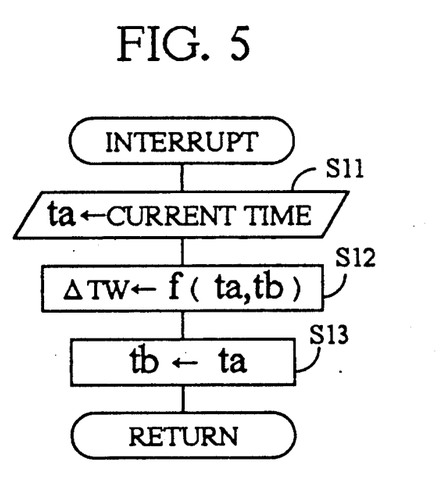
FIG. 5 is a flow chart showing the the processing of the interrupt routine in the same preferred embodiment of the present invention.

FIG. 5 shows the interrupt routine mentioned above, and the interval of time between the previous interrupt demand and the current interrupt demand, namely, the period ΔTw of the output electrical signal from the wheel velocity sensor 20, is measured. First, the current time ta is set up at the step S11 by the free run timer. Next, at the step S12, the difference of time between the time tb when the previous interrupt demand was made and the current time ta is found by arithmetic operations, and the period ΔTw of the output electrical signal from the wheel velocity sensor 20 is thereby set up. Then, the operation proceeding to the step S13, the time tb is renewed and set up in preparation for the next interrupt demand. After the processes at the step S11 through S13 are performed, the processing of the main routine is performed again.

Figure 6:
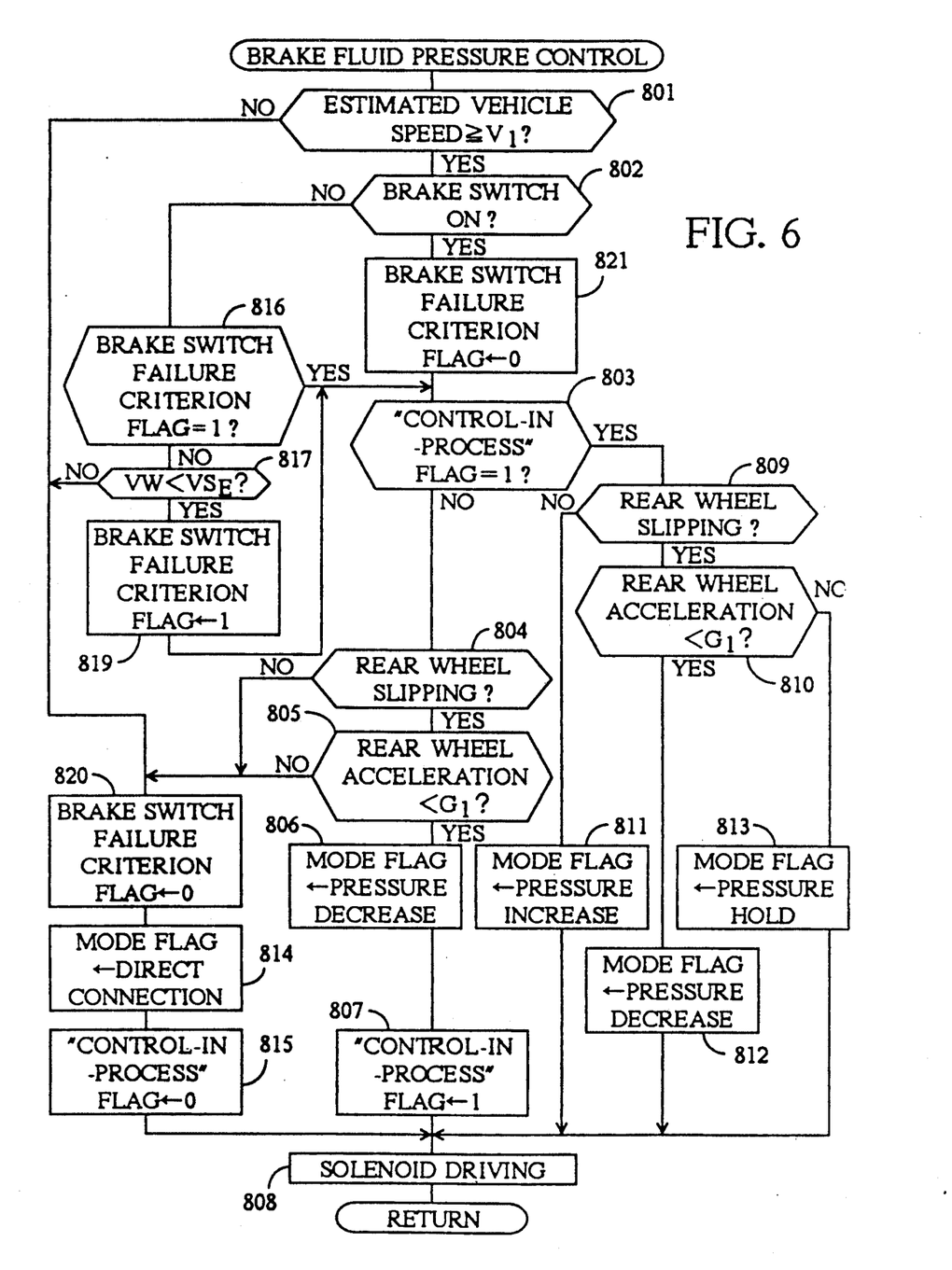
FIG. 6 is a flow chart showing the processing of the subroutine for the control of brake fluid pressure in the same preferred embodiment of the present invention.

Next, with reference to FIG. 6, a description is made of the subroutine for the control of the brake fluid pressure to be performed at the step S8 shown in FIG. 4. First, at the step 801, the estimated vehicle speed $Vs_0$ is compared with the prescribed stop marking speed $V_1$. This stop marking speed $V_1$ is the speed for use as the criterion for judging whether or not the vehicle is stopped, and it is set at approximately 5 km/h for this example of preferred embodiment. In case the estimated vehicle speed $Vs_0$ is either equal to or in excess of the stop marking speed $V_1$, the process at the step 802 is performed. In contrast to this, in case the estimated vehicle speed $Vs_0$ is less than the stop marking speed $V_1$, the system proceeds to the step 820, at which the brake switch failure marking flag described later is cleared, and the brake fluid pressure control is not performed.

At the step 802, it is judged whether or not the brake switch 22 is turned ON. When the brake switch 22 is turned ON, the system proceeds to the step 821. In case the brake switch 22 is turned OFF, the system proceeds to the step 816, at which it is judged whether or not the brake switch failure marking flag is set. This brake switch failure marking flag, which is set up at the step 819, as described later, is the flag set up to make it possible to start the anti-skid control at the point in time when the relationship, $Vw < Vs_E$, is found by comparing the second standard speed $Vs_E$, which is obtained from the second estimated vehicle speed $Vs_2$ described later, with the wheel velocity Vw, in case the brake switch 22 fails to be turned ON, in consequence of a trouble or the like in the brake switch, when the brake is operated. Provided that the brake switch failure marking flag remains set up as at the step 816, the system proceeds to the step 803.

At the step 817, it is judged whether or not the relationship, $Vw < Vs_E$, is found when the brake switch mentioned above remains turned OFF, and, when the vehicle speed Vw is lower than the second standard speed $Vs_E$ (i.e. $Vw < Vs_E$), the system proceeds to the step 819, setting the brake switch failure marking flag and then proceeding to the step 803, so that the anti-skid control may be started. In contrast to this, in case the wheel velocity Vw is equal to or in excess of the second standard speed $Vs_E$ (i.e. $Vw \geq Vs_E$), the system proceeds to the step 820, judging that no slip will occur in the wheels RR and RL.

At the step 821, the brake switch failure marking flag is cleared, and the system proceeds to the step 803, at which it is judged whether or not any "control-in-process" flag is set up. This "control-in-process" flag is the flag which is set up at the step 807 described later when the brake fluid pressure control is started, and the flag remains in the state of being set while the brake fluid pressure control is being performed. The system proceeds to the step 809 in case the "control-in-process" flag remains set, but proceeds to the step 804 in case the flag is not set.

At the step 804, it is judged whether or not the rear wheels RR and RL, which are the driving wheels, are slipping. First, at the time of the ordinary braking operation, it is judged whether or not the wheel velocity Vw of the rear wheels is any lower than the first standard speed $VS_N$ obtained at the step S7 shown in FIG. 4. In case it is found that the wheel velocity Vw is any lower than the first standard speed $Vs_N$ (i.e. $Vw < Vs_N$), it is judged that a slip has occurred to the wheels RR and RL, and the system proceeds to the step 805. In contrast to this, when the wheel velocity Vw is equal to or in excess of the first standard speed $Vs_N$ (i.e. $Vw \geq Vs_N$), it is judged that the wheels RR and RL are not slipping. In this case, the system proceeds to the step 820, at which it clears the brake switch failure marking flag and also does not perform any brake fluid pressure control.

At the step 805, it is judged whether or not the wheel acceleration Gw of the rear wheels is any smaller than the prescribed acceleration $G_1$. In case the wheel acceleration Gw of the rear wheels is found to be any smaller than the prescribed acceleration $G_1$ (i.e. $Gw < G_1$), it is judged that the rear wheels RR and RL are just about to lock. In such a case, the step 806 is executed, and the brake fluid pressure control is started. In contrast to this, when the wheel acceleration Gw of the rear wheels is equal to or any larger than the prescribed acceleration (i.e. $Gw \geq G_1$), it is judged that the rear wheels RR and RL will not lock immediately, and the system proceeds to the step 820, not performing any brake fluid pressure control.

If the step 806 mentioned above is performed, the electronic control device 11 starts the brake fluid pressure control. At the step 806, the mode flag is set in the pressure decrease mode, and, after the "control-in-process" flag is set at the step 807, the state of excitation and the state of non-excitation are set in the solenoids 31 and 32 in such a manner that the pressure of the brake fluid in the wheel cylinders 53 and 54 is reduced at the step 808. Moreover, the "control-in-process" flag is kept in its set state until the first estimated vehicle speed $Vs_0$ declines to a level lower than the stop marking speed $V_1$ or until the brake switch 22 is turned OFF and also assumes the state in which it is not judged to be in failure (at the steps 802, 816, and 817).

At the step 808, the state of excitation and the state of non-excitation are set in the solenoids 31 and 32, depending on the mode flag, which indicates either one of the "pressure decrease" mode, the "pressure increase" mode, the "pressure hold" mode, and the "direct connection" mode. Then, at the step S9 shown in FIG. 4, a driving signal is generated. When "pressure decrease" is indicated on the mode flag, the brake fluid pressure is reduced with an interconnection established between the wheel cylinders 53 and 54 and the reserver 41 by the action of the actuator 30. Moreover, when "pressure increase" is indicated on the mode flag, the fluid pressure output from the pump 40 is fed into the wheel cylinders 53 and 54 by the action of the actuator 30, and the brake fluid pressure in the said cylinders is thereby increased. Furthermore, when "pressure hold" is indicated on the mode flag, the brake fluid pressure in the wheel cylinders 53 and 54 is maintained by the action of the actuator 30. Additionally, when "direct connection" is indicated on the mode flag, the wheel cylinders 53 and 54 and the master cylinder 2a are directly connected by way of the actuator 30.

On the other hand, if the "control-in-process" flag is set at the step 803, the system proceeds to the step 809, at which it is judged whether or not the rear wheels RR and RL, which are the driving wheels, are slipping. Now, since the process at this step 809 is the same as that at the step 804 mentioned above, a description of the process is omitted. In case it is judged that the wheels RR and RL are slipping, the system proceeds to the step 810. In case it is found that the wheels RR and RL are not slipping, the mode flag is set at "pressure increase" at the step 811, and, proceeding to the step 808, the system performs the pressure increase control of the brake fluid pressure in the wheel cylinders 53 and 54.

At the step 809, it is judged whether or not the wheel acceleration Gw of the rear wheels is any smaller than the prescribed acceleration $G_1$. In this regard, since the process at the step 809 is the same as that at the step 805, a description of the process is omitted here. In case the wheel acceleration Gw of the rear wheels is any smaller than the prescribed acceleration $G_1$, the mode flag is set at "pressure decrease" at the step 812, and the system proceeds to the step 808, at which it performs the pressure decrease control of the brake fluid pressure in the wheel cylinders 53 and 54. In case the wheel acceleration Gw of the rear wheels is equal to or in excess of the prescribed acceleration $G_1$, the mode flag is set at "pressure hold" at the step 813, the system thereafter proceeding to the step 808, at which it performs the pressure maintaining control of the brake fluid pressure in the wheel cylinders 53 and 54.

By the repeated execution of the steps 808 through 813 mentioned above, the slip factor between the wheels RR and RL and the road surface is maintained at an approximately constant value, and stable braking force is thereby secured. Moreover, when the mode flag is set at "direct connection" at the step 814 upon the completion of the brake fluid pressure control, the "control-in-process" flag is reset at the step 815.

Next, the subroutine for the arithmetic operations performed to find the estimated vehicle speed at the step S7 shown in FIG. 4 is described with reference to FIG. 7. At this juncture, two estimated vehicle speeds, namely, the first estimated vehicle speed $V_{S0}$ and the second estimated vehicle speed $V_{S2}$, as described above, are worked out by arithmetic operations.

First, at the step 701, the first value $W_0$ is found by arithmetic operations with the equation (6) given in the following:

$$W_0 = MED(V_W, V_{S0(n-1)} - \alpha_{DW} \cdot t, V_{S0(n-1)} + \alpha_{UP} \cdot t) \quad \ldots (6)$$

Wherein, Vw represents the wheel velocity, and $V_{S0(n-)}$ represents the first estimated vehicle speed $V_{S0}$ which was obtained at the previous time. $\alpha_{DW}$ represents the value for setting a limit to the deceleration of speed in relation to the first estimated vehicle speed $V_{S0}$, namely, the decrease ratio of $V_{S0}$, and, as shown in FIG. 3 given below, the value $\alpha_{DW}$ is set in accordance with the state of the output from the acceleration sensor 21, the on and off states of the brake switch 22, and the presence or absence of the set "control-in-process" flag. $\alpha_{UP}$ represents the value for setting a limit to the acceleration in relation to the first estimated vehicle speed $V_{S0}$, namely, the increase ratio of $V_{S0}$, and, as shown in FIG. 4 given below, $\alpha_{UP}$ is set in accordance with the state of the output from the acceleration sensor 21 and the presence or absence of the set "control-in-process" flag. t represents the period of arithmetic operations, and it is set, for example, at 10 ms. Moreover, MED (A, B, C) represents the function which gives the median value of A, B, and C. Thus, $V_{S0(n-1)} + \alpha_{UP} \cdot t$ corresponds to the first set speed, and $V_{S0(n-1)} - \alpha_{DW} \cdot t$ corresponds to the second set speed.

TABLE 3

| $\alpha_{DW}$ | Control-in-Process Flag = 0 | | |
|---|---|---|---|
| Road Surface Classification | Brake Switch OFF | Brake Switch ON | Control-in-Process Flag = 1 |
| Low μ | 4.0 G | 0.4 G | 0.3 G |
| Medium μ | | 0.6 G | 0.5 G |
| High μ | | 1.1 G | 1.1 G |

TABLE 4

| $\alpha_{UP}$ Road Surface Classification | Control-in-Process Flag = 0 | Control-in-Process Flag = 1 |
|---|---|---|
| Low μ | 0.25 G | 4.0 G |
| Medium μ | 0.4 G | |
| High μ | 0.4 G | |

In the Tables given above, G represents the acceleration of gravity.

Moreover, with regard to Table 3, it is judged that, in case the system, for example, has not shifted to the anti-skid control as the "control-in-process" flag is set at "zero" in the brake fluid pressure control at the step S8 shown in FIG. 4, the system judges, for example, that the road surface has a low μ on the basis of the output from the acceleration sensor 21, and, if the brake switch 22 is turned ON, the system sets 0.4 G while it sets 4.0 G in case the brake switch is OFF. As regards Table 4, the system, for example, sets $\alpha_{UP}$ at 0.4 G if it judges that the road surface has a high μ in case it does not shift to the anti-skid control.

Subsequently, the second value $W_2$ is calculated with the following equation (7) at the step 702 shown in FIG. 7.

$$W_2 = MED(V_W, V_{S2(n-1)} - \alpha_{DW2} \cdot t, V_{S2(n-1)} + \alpha_{UP2} \cdot t) \quad \ldots (7)$$

Wherein, $V_{S2}$ represents the second estimated vehicle speed, which is to be applied to the identification of the state of braking, and $V_{S2(n-1)}$ indicates the second estimated vehicle speed found at the previous time. $\alpha_{DW2}$ indicates the value which sets a limit to the deceleration in relation to the second estimated vehicle speed $V_{S2}$, namely, the decrease ratio of $V_{S2}$, and this value is set in accordance with the state of the output from the acceleration sensor 21, as shown in Table 5 given below. $\alpha_{UP2}$ is the value which sets a limit to the acceleration in relation to the second estimated vehicle speed $V_{S2}$, namely, the increase ratio of $V_{S2}$, and this value is set in accordance with the output from the acceleration sensor 21 and the state of the acceleration slip, as shown in Table 6 given below.

TABLE 5

| $a_{DW2}$ Road Surface Classification | Control-in-Process Flag = 0 |
|---|---|
| Low μ | 0.4 G |
| Medium μ | 0.6 G |
| High μ | 1.1 G |

TABLE 6

| | Control-in-Process Flag = 0 | |
|---|---|---|
| $a_{UP2}$ Road Surface Classification | $a_{UP2}$ Switching Demand: None | $a_{UP2}$ Switching Demand: Set |
| Low μ | 0.16 G | 0.03 G |
| Medium μ | 0.3 G | 0.16 G |
| High μ | 0.4 G | 0.3 G |

In Tables 5 and 6 given above, the conditions based on the results of the road surface classification are the same as those in Tables 3 and 4. However, in either of Tables 5 and 6, it is set as a condition that the "control-in-process" flag is zero. That is to say, $a_{DW2}$ and $a_{UP2}$ are set up in order to work out the second estimated vehicle speed $V_{S2}$ which is used for the shift to the anti-skid control. Moreover, a description will be made later with respect to "$a_{UP2}$ switching demand" appearing in Table 6.

After the first value $W_0$ and the second value $W_2$ are found by the arithmetic operations performed at the steps 701 and 702 as described above, it is judged at the step 703 whether or not the "control-in-process" flag is in the set state. That is to say, it is judged that the operation of the system has shifted to the anti-skid control in the brake fluid pressure control at the step S8. If the "control-in-process" flag remains set, the system proceeds to the step 704, and both the first estimated vehicle speed $V_{S0}$ and the second estimated vehicle speed $V_{S2}$ are set at the first value $W_0$.

If the "control-in-process" flag is not set with the system in the state prior to the anti-skid control operation, the first estimated vehicle speed $V_{S0}$ and the second estimated vehicle speed $V_{S2}$ are set separately at the step 705. That is to say, the second estimated vehicle speed $V_{S2}$ is set at the second value $W_2$ while the first estimated vehicle speed $V_{S0}$ is set at the larger of the first value $W_0$ and the second value $W_2$. In this regard, MAX (A, B) used at the step 705 is the function which gives the larger of the two values, A and B.

Now, a wheel spin occurs, putting the motor vehicle in the state of the so-called acceleration slip, if any excessive driving force generated by a drastic accelerating action is applied to the wheels RR and RL, which are the driving wheels. When the state of such an acceleration slip is detected, the system makes the "$a_{UP2}$ demand" mentioned above in order to set the increase ratio $a_{UP2}$ for the second estimated vehicle speed $V_{S2}$.

Figure 7:
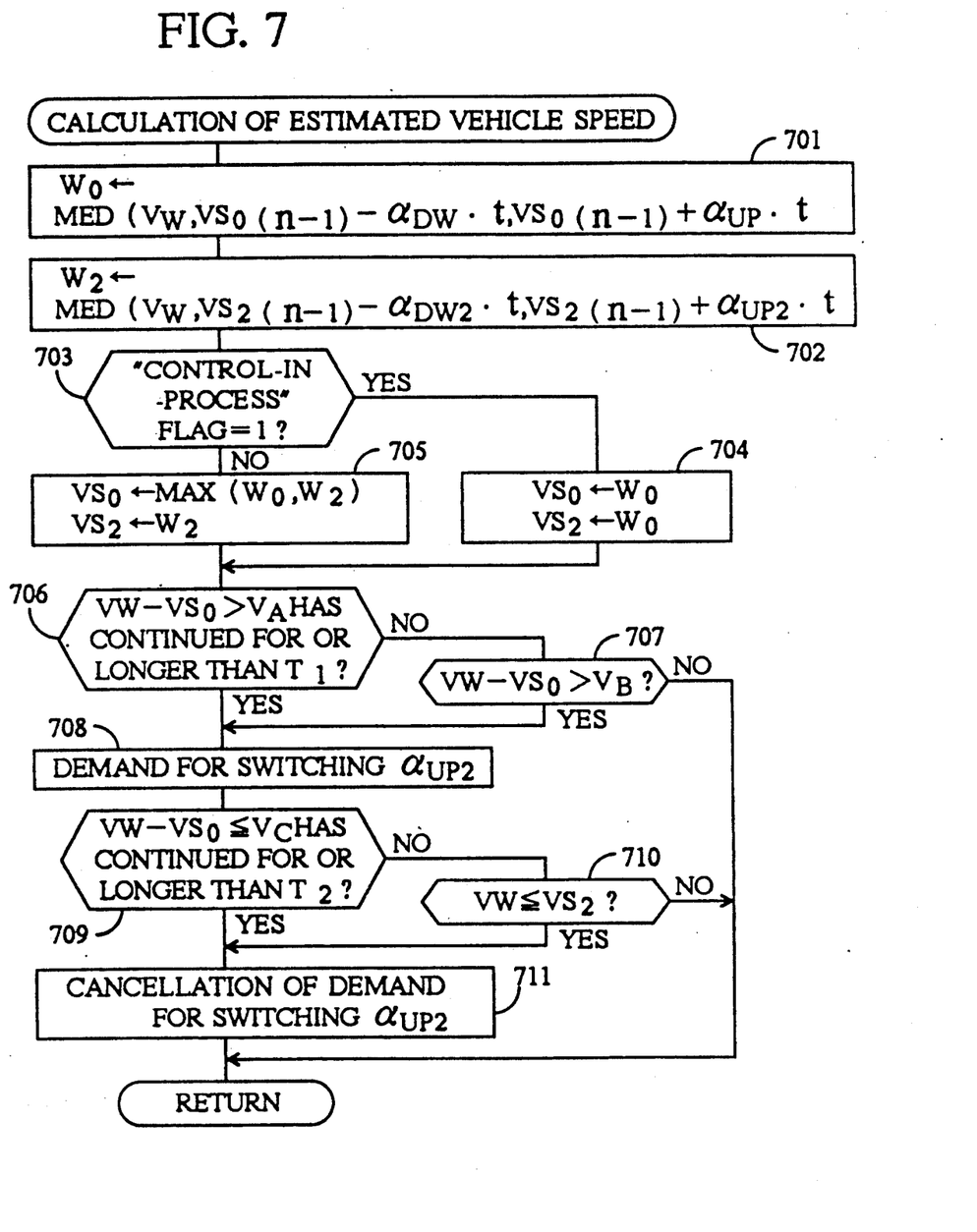
FIG. 7 is a flow chart showing the processing of the subroutine for the arithmetic operations for finding the estimated vehicle speed in the same preferred embodiment of the present invention.

Therefore, at the steps 706 through 711 shown in FIG. 7, the system makes a demand for the switching of $a_{UP2}$ and also cancels such a demand, offering the same for the processing of arithmetic operations at the next time. That is to say, the demand for the switching of $a_{UP2}$ is set in case the state in which the difference between the wheel velocity Vw and the first estimated vehicle speed $V_{S0}$ is larger than the prescribed speed $V_A$ (i.e. $Vw = V_{S0} > V_A$) continues for or in excess of the prescribed duration of time $T_1$ (the step 706) or in case the difference between the wheel velocity Vw and the first estimated vehicle speed $V_{S0}$ is larger than the prescribed speed $V_B$ (i.e. $Vw - V_{S0} > V_B$) (the step 707), a demand for the switching of $a_{UP2}$ is set (the step 708). For example, 0.5 km/h is set for $V_A$, 10 km/h is set for $V_B$, and 200 mS is set for $T_1$.

Then, as regards the condition for the cancellation of the demand for the switching of $a_{UP2}$, the demand is canceled (at the step 711) in case the state in which the difference between the wheel velocity Vw and the first estimated vehicle speed $V_{S0}$ is smaller than the prescribed speed $V_c$ (i.e. $Vw - V_{S0} \leq V_c$) has continued for or in excess of the prescribed duration of time $T_2$ (the step 709), or in case the wheel velocity Vw has declined to a level below the second estimated vehicle speed $V_{S2}$ (the step 710). For example, 0.5 km/h is set for $V_c$, and 5 Sec. is set for $T_2$. Moreover, at the step S1 for initialization shown in FIG. 4, these factors are set at the values prior to the demand for the switching of $a_{UP2}$. As mentioned above, the setting and cancellation of the demand for the switching of $a_{UP2}$ are effected in accordance with the magnitude of the wheel velocity Vw, and the demand so set and/or canceled is offered for use in the setting of the second estimated vehicle speed $V_{S2}$.

Now, the relationship between the first estimated vehicle speed $V_{S0}$ and the second estimated vehicle speed $V_{S2}$, which are obtained in the manner described above, is described with reference to the operations performed at the time of acceleration and at the time of deceleration.

Figure 8:
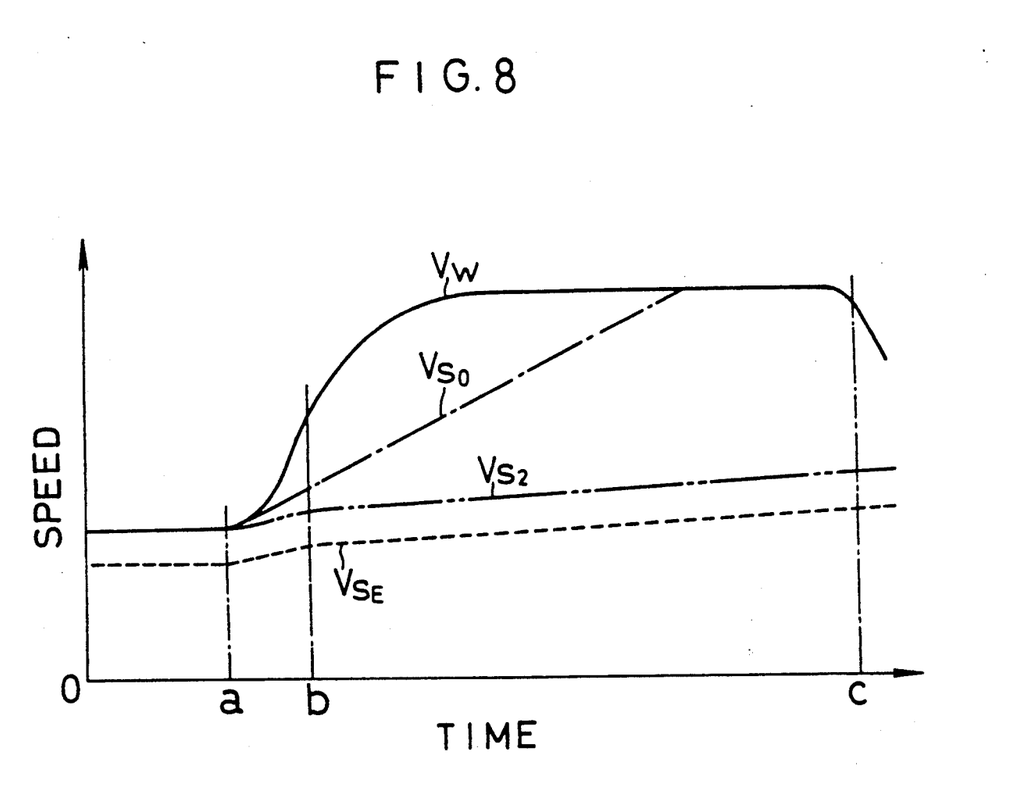
FIG. 8 is a graph illustrating the relationship between the first estimated vehicle speed and the second estimated vehicle speed for application when an acceleration slip has occurred.

FIG. 8 shows the fluctuations which occur in the wheel velocity at the time when an acceleration slip has occurred. It is observed, with reference to FIG. 8, that an accelerating operation was performed at the point a when the motor vehicle was in the state of its running at a constant speed and that the wheel velocity Vw increased sharply, resulting in an acceleration slip. At such a time, the acceleration sensor 21 will indicate a value less than 0.2 G when the road surface classification is "low μ", for example, it can be inferred that the actual vehicle speed V was in the range between the vehicle speed approximately the same as the wheel velocity Vw immediately before the accelerating operation was performed at the point a and the vehicle speed attained by acceleration at the maximum value of acceleration corresponding to the result of the road surface classification as at the time when the accelerating operation was performed, namely, 0.2 G. In this example of preferred embodiment, the first estimated vehicle speed $V_{S0}$ indicated by the single dot chain line is obtained for the latter while the second estimated vehicle speed $V_{S2}$ shown by the two dot chain line is obtained for the former, both being used for the control. That is to say, the first value $W_0$ as worked out at the step 701 is found to be the value of the speed $(V_{S0}(n-1) + a_{UP} \cdot t)$ obtained on the basis of $a_{UP} = 0.25$ G, and this first value $W_0$ is set as the first estimated vehicle speed $V_{S0}$ at the step 705. Moreover, the second value $W_2$ as worked out at the step 702 is found to be the value of the speed obtained on the basis of $a_{UP2} = 0.16$ G, and this second value $W_2$ is set as the second estimated vehicle speed $V_{S2}$. In this case, $a_{UP} = 0.25$ G taken from Table 4 is used for the first estimated vehicle speed $V_{S0}$, and this value is set at a value larger than 0.2 G mentioned above in order to account for the error due to the running on a slop, the position of installation of the acceleration sensor 21, and so forth. Also, the value of $\alpha_{UP}$ is set at 0.4 G for the road surface classification categories defined as "medium $\mu$" and "high $\mu$", and this value has been set in consideration of the accelerating performance of the ordinary motor vehicles. Thus, the $\alpha_{UP}$ value will be set at a different value if the accelerating performance of a motor vehicle is different from what is assumed above.

In case the state in which the difference between the vehicle velocity Vw and the first estimated vehicle speed $Vs_0$ is equal to or in excess of the prescribed speed $V_a$ continues for a duration of time not less than the prescribed duration of time $T_1$, the system judges that the motor vehicles is in the state of acceleration slip and makes a demand for the switching of $\alpha_{UP2}$ as described above. Accordingly, the value of the increase ratio $\alpha_{UP2}$ is shifted from 0.16 G to 0.03 G, so that the second estimated vehicle speed $Vs_2$ after the point b shown in FIG. 8 is set at a gradual increase ratio. That is to say, the value of the increase ratio is set in such a manner that adequate brake fluid pressure control can be performed when a braking operation is performed subsequently, with the cancellation of the accelerating operation, immediately after the occurrence of the state of acceleration slip.

Then, when the wheel velocity Vw stops increasing, the first estimated vehicle speed $Vs_0$ then becoming equal to the wheel velocity Vw, the first estimated vehicle speed $Vs_0$ is set and kept thereafter at the same speed as the wheel velocity Vw. In the meantime, moreover, the decrease ratio $\alpha_{DW}$ is set at 4.0 as shown in Table 3 mentioned above, and, consequently, the speed ($Vs_{0 (n-1)} - \alpha_{DW} \cdot t$), which is obtained on the basis of the value 4.0 G, is considerably lower than the wheel speed Vw (= $Vs_0$), so that the wheel speed Vw will not be any lower than the above-mentioned speed even if the accelerating operation is canceled after the occurrence of the acceleration slip after the point c in FIG. 8).

Figure 9:
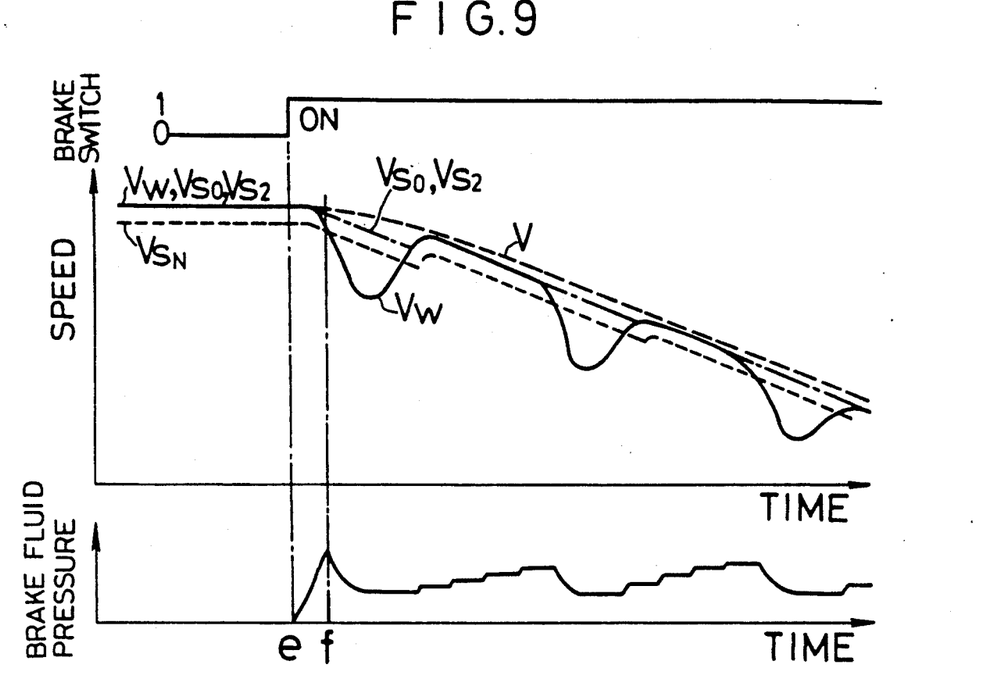
FIG. 9 and FIG. 10 are graphs each showing the relationship between the first estimated vehicle speed and the second estimated vehicle speed for application at the time of the deceleration of the vehicle.
Figure 10:
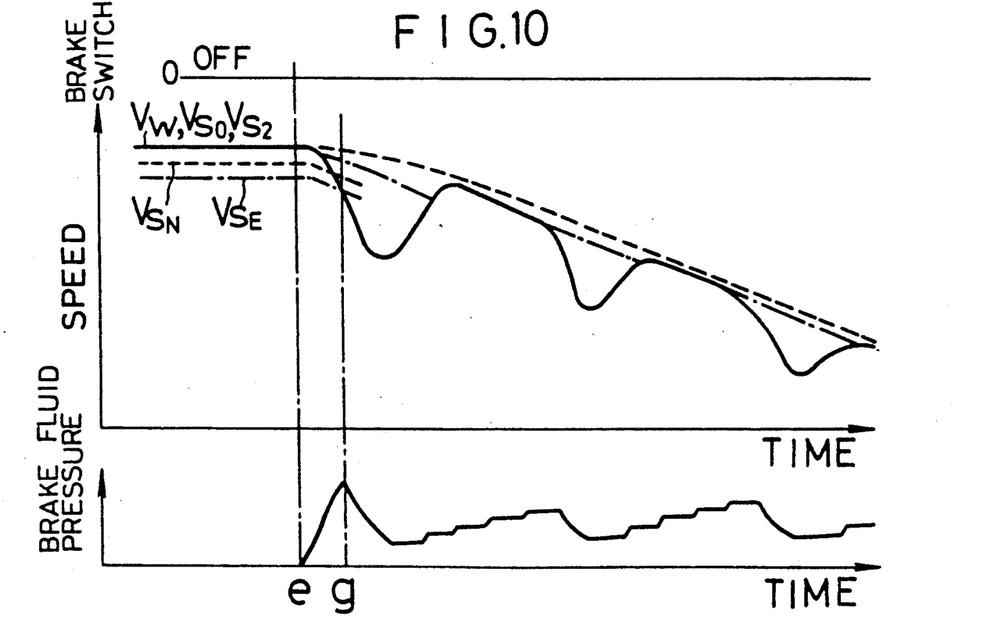

Next, with reference to FIG. 9 and FIG. 10, a description is made of the relationship bewteen the first estimated vehicle speed $Vs_0$ and the second estimated vehicle speed $Vs_2$ at the time when the motor vehicle is decelerated. In FIG. 9, a braking operation is performed at the point e, the brake switch 22 being thereupon turned on, and, with the anti-skid control operation started at the point f, the operation for a reduction of pressure is performed on the brake fluid pressure. Moreover, in this example of preferred embodiment, the system uses the first standard speed $Vs_N(= Vs_0 \times 0.97 - 2$ km/h), which is obtained from the first estimated vehicle speed $Vs_0$, as the criterion speed at which the system starts the anti-skid control as described above. Thus, the system is so constructed that it starts the anti-skid control, judging that a slip has occurred when the wheel speed Vw has become lower than the first standard speed $Vs_N$ (i.e. Vw < $Vs_N$).

FIG. 10 shows a state in which the brake switch is not turned ON at the point e, even if the brake is operated, because of a trouble affecting the brake switch 22, for example. In such a case, the first estimated vehicle speed $V_{s0}$ will be the smae as the wheel speed Vw since the decrease ratio $\alpha_{DW}$ is set at 4.0 G for the calculation of the first estimated vehicle speed $Vs_0$, as it is clearly seen in Table 3 mentioned above. That is to say, the system is designed to start the anti-skid control in response to the ON-operation of the brake switch 22, and the anti-skid control system is thus prevented from making any error in its operation in the course of the normal running of the motor vehicle.

On the other hand, this example of preferred embodiment performs the arithmetic operations to find the second estimated vehicle speed $Vs_2$ and furnishes the value for use in the comparison with the wheel velocity Vw, without any regard to the ON/OFF operations of the brake switch 22, prior to the performance of the anti-skid control. That is to say, the second standard speed $Vs_E(= Vs_2 \times 0.90 - 5$ km/h), which is obtained from the second estimated vehicle speed $Vs_2$, is used as the criterion speed for the start of the anti-skid control in this instance. By this, the anti-skid control is started when the wheel velocity Vw falls to a level lower than the second standard speed $Vs_E$ (i.e. Vw < $Vs_E$) at the point g shown in FIG. 10. Thus, the anti-skid control system in this example of preferred embodiment is capable of dealing in a proper and highly reliable manner with a sharp decline in the wheel velocity Vw, regardless of the operation of the brake switch 22, even though it has a delay from the point f mentioned above in terms of the time for the start of the controlling operation.

In the following part, an example of the fluctuations in the wheel velocity Vw from the accelerating operation to the braking operation is described, with respect to the operations of the system in this example of preferred embodiment, with reference to FIG. 11.

Figure 11:
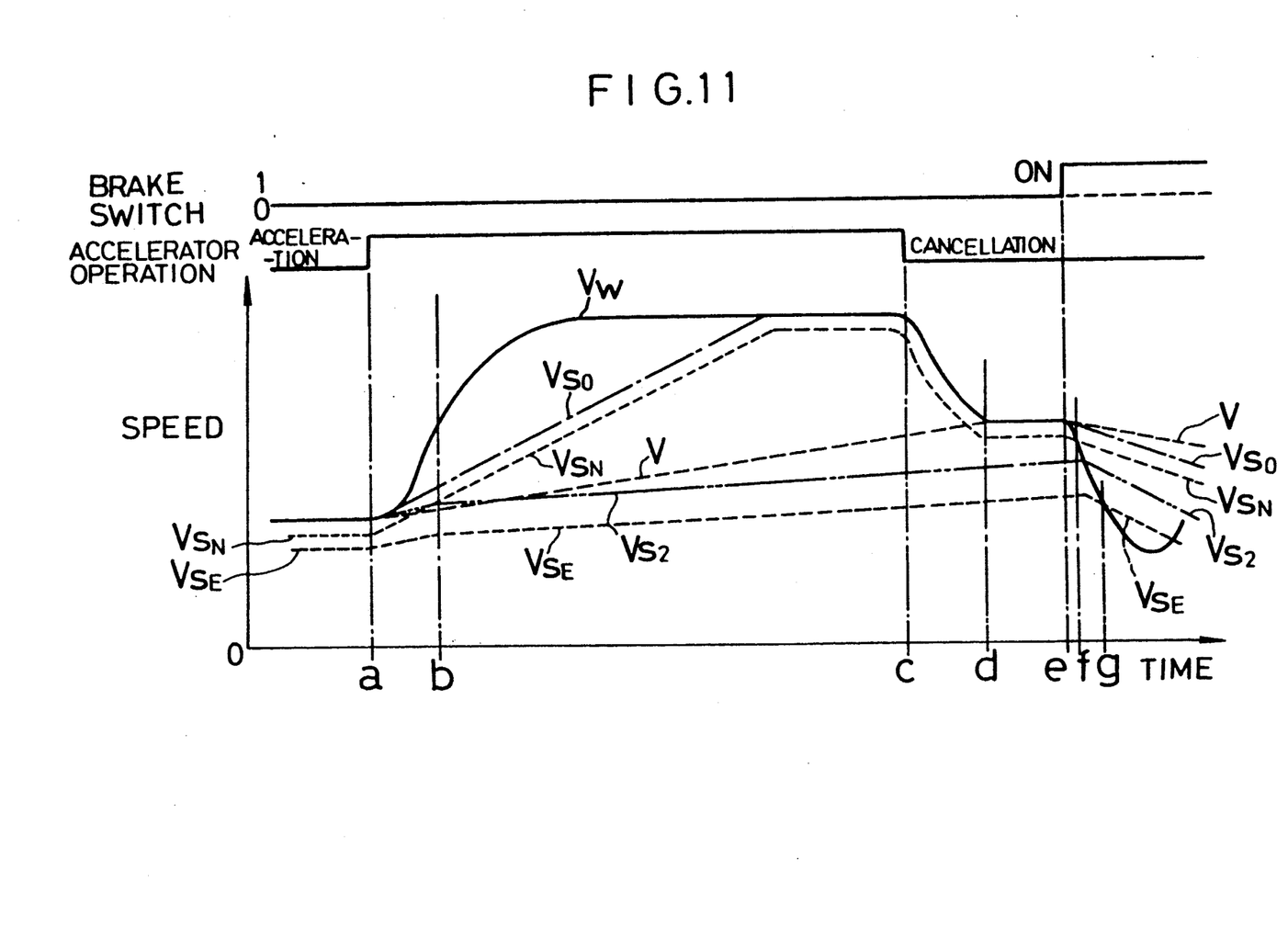
FIG. 11 is a graph showing the state of control by the anti-skid control system in one preferred embodiment according to the present invention.

When the motor vehicle is running at a constant speed, both the first estimated vehicle speed $Vs_0$ and the second estimated vehicle speed $Vs_2$ are equal to the wheel velocity Vw, and the first standard speed $Vs_N$ and the second standard speed $Vs_E$ are in the relationship shown at the left end of FIG. 11.

Next, in case the vehicle has fallen into the state of an acceleration slip in consequence of a sudden accelerating operation at the point a, the system sets the value at the first estimated vehicle speed $Vs_0$ as obtained on the basis of the value, $\alpha_{UP} = 0.25$, so that the standard speed will be in a straight line indicated by the single dot chain line in the Figure, in case the road surface classification category as judged by the system is low $\mu$, for example. Moreover, for the second estimated vehicle speed $Vs_2$, which is calculated at the same time, the value $\alpha_{UP} = 0.16$ G is used, so that the speed shows an increase ratio more moderate than that of the first estimated vehicle speed $Vs_0$, as it is shown by the two dot chain line in the Figure.

In case the wheel velocity Vw continues to increase and to maintain a speed not less than the prescribed speed difference in relation to the first estimated vehicle speed $Vs_0$ up to the point b, the system makes the demand for the switching of $\alpha_{UP2}$ as mentioned above, and the second estimated vehicle speed $Vs_2$ assumes the value obtained on the basis of the value $\alpha_{UP2} = 0.03$ G, and the newly selected value will result in a more moderate speed increase ratio as expressed in a straight line. That is to say, the system judged that the state of an acceleration slip occurred at the point b, and, along with this, has set an adequate value for the second standard speed $Vs_E$, which is used at the time when the braking operation is subsequently performed. Thus, the actual vehicle speed V in the meanwhile, will be in the range enclosed by the first estimated vehicle speed $Vs_0$ and the second estimated vehicle speed $Vs_2$, as shown in FIG. 11.

When the accelerating operation is discontinued at the point c, the wheel velocity Vw declines sharply and becomes equal to the actual vehicle spped V at the point d. Then, when the brake switch 22 is turned ON with a braking operation performed at the point e, the wheel velocity Vw declines sharply. Here, the system is so designed that the first estimated vehicle speed $Vs_0$ is set at the same speed as the wheel speed Vw while the brake switch 22 remains turned OFF, so that the said estimated vehicle speed will not be any lower than the speed obtained on the basis of the value $\alpha_{DW}=4.0$ G, and consequently the condition for the start of the anti-skid control is not fulfilled. After the brake switch 22 is turned ON, the limiting value for the decrease ratio is set at $\alpha_{DW}=0.4$ G, on the basis of which the first estimated vehicle speed $Vs_0$ and the first standard speed $Vs_N$ are found by arithmetic operations. Accordingly, the wheel velocity Vw will be lower than the first standard speed $Vs_N$ at the point f, and the anti-skid control is started, with a reduction of pressure being effected in the brake fluid in the wheel cylinders 52 and 54.

In case the brake switch is not turned ON at the point f in spite of the fact that a braking operation is performed, the arithmetic operations will be performed with the first estimated vehicle speed $Vs_0$ being reset at the value, $\alpha=4.0$ G, namely, at the value equal to that of the wheel speed Vw, the system will not shift to the anti-skid control operation. In the mean while, the seconad estimated vehicle speed $Vs_2$ will assume the value obtained on the basis oaf the value, $\alpha_{DW2}=0.4$ G as from the point in time when the wheel velocity Vw decreases to a level below the said second estimated vehicle speed, and consequently, the wheel velocity Vw will be lower than the second standard speed $Vs_E$ at the point g. Therefore, the brake fluid pressure in the wheel cylinders 53 and 54 is reduced at this point g, and the anti-skid control is started. Although this system has a slight delay from the point f, which is the ordinary point of time for starting the anti-skid control, this system performs the anti-skid control properly and with a high degree of certainty. In other words, it is evident that the brake switch 22 was not turned ON, despite the braking operation, at the point g, where the second standard speed $VS_E$ forms the condition for the start of the anti-skid control.

Advantageous Effect of the Invention

The present invention, which is constructed as described above, achieves the following advantageous effects.

Specifically, the anti-skid control system according to the present invention works out the first estimated vehicle speed on the basis of the increase ratio and decrease ratio of the wheel velocity as set in accordance with the output signals from the acceleration detecting means installed on the motor vehicle, and sets the decrease ratio at a larger value for the time when the system does not detect any braking operation than that at the time when the system detects such an operation. Hence, the system does not cause any error in the anti-skid control operation in consequence of a decline which occurs in the wheel velocity due to the cancellation of the accelerating operation after the occurrence of an acceleration slip, and the system can therefore shift thereafter to the anti-skid control operation in a precise and accurate manner through its performance of adequate control over the brake fluid pressure.

In addition, the anti-skid control system according to the present invention is provided also with the means of setting the second estimated vehicle speed, with which the system is capable of starting the anti-skid control, without any regard to the detection output from the brake operation detecting means, and can therefore perform the anti-skid control with certainty even in case the brake operation detecting means fails to function.

Moreover, in an embodiment of the present invention in which the system is designed to set the increase ratio for the third set speed with switching in accordance with the fluctuations of the wheel velocity, with respect to the setting of the said increase ratio of the third set speed with the second estimated vehicle speed setting means, the system is capable of making itself ready for its adequate brake fluid pressure control to be performed at the time of a subsequent brake operation at the point in time when an acceleration slip occurs and can therefore produce good response even to an abrupt accelerating operation and a sharp braking operation.

What is claimed is:

1. An anti-skid control system which is provided with wheel cylinders installed on the individual wheels, including the driving wheels, of a motor vehicle and furnishing braking force to the said wheels, a fluid pressure generating device, which supplies brake fluid pressure in accordance with the brake operation on the brake operating member to each of the said wheel cylinders, a fluid pressure controlling device set in the fluid pressure channels connected to form intercommunicating links betweenn the wheel cylinders installed on the said fluid pressure generating device and the said driving wheels, a brake operation detecting means, which detects the brake operation of the said brake operating member, an acceleration detecting means, which is installed on the said motor vehicle and detects the acceleration of the said motor vehicle, a wheel velocity detecting means, which detects the wheel velocity of the said driving wheels, and a braking force controlling means, which controls the brake fluid pressure fed to the wheel cylinders installed on the said driving wheels, driving and controlling the fluid pressure controlling device in accordance with the output signals from the said wheel velocity detecting means and the said acceleration detecting means when the said brake operation detecting means has detected any brake operation, wherein the said anti-skid control system is characterized by being equipped with a first estimated vehicle speed setting means, which sets the prescribed increase ratio to the said wheel velocity in accordance with the output signals from the said acceleration detecting means, finding a first set speed through arithmetic operations performed on the basis of the said increase ratio, and also sets the prescribed decrease ratio to the said wheel velocity, finding a second set speed through arithmetic operations performed on the basis of the said decrease ratio, and sets a first estimated vehicle speed by selecting the median value of the said second set speed, the said first set speed, and the said wheel velocity, and a second estimated vehicle speed setting means, which sets the second estimated vehicle speed, setting an increase ratio corresponding to the prescribed increase ratio for the said wheel velocity and yet smaller than the prescribed increase ratio for the said first set speed in accordance with the output signals from the acceleration detecting means mentioned above, finding a third set speed through arithmetic operations performed on the basis of the said increase ratio, also setting the prescribed decrease ratio for the said wheel velocity and finding a fourth set speed on the basis of the said decrease ratio, and selecting the median value of the said fourth set speed, the said third set speed and the said wheel velocity, and also by driving the said fluid pressure controlling device in accordance with the result of comparison with the said wheel velocity, finding the said first estimated vehicle speed through arithmetic operations performed with the said prescribed decrease ratio for the said second set speed switched to a decrease ratio smaller than that set prior to the detection of the brake operation, when the brake operation detecting means mentioned above has detected any brake operation, and yet driving the said fluid pressure controlling device in accordance with the result of comparison with the said second estimated vehicle speed and the said wheel velocity, when the said brake operation detecting means has not detected any brake operation.

2. An anti-skid control system as defined in claim 1, wherein the second estimated vehicle speed setting means mentioned above is constructed in such a manner as to set the prescribed increase ratio for the third set speed mentioned above by switching the increase ratio current at the particular moment to another increase ratio smaller than the said current ratio, in case the wheel velocity becomes larger, at least by any excess of the prescribed speed, than the first estimated vehicle speed.

* * * * *